US008915702B2

(12) United States Patent
Otto et al.

(10) Patent No.: US 8,915,702 B2
(45) Date of Patent: *Dec. 23, 2014

(54) GAS TURBINE ENGINE FRONT CENTER BODY ARCHITECTURE

(71) Applicant: United Technologies Corporation, Hartford, CT (US)

(72) Inventors: John R. Otto, Middletown, CT (US); Brian P. Cigal, Windsor, CT (US); Sunil Sharma, Rocky Hill, CT (US)

(73) Assignee: United Technologies Corporation, Hartford, CT (US)

( * ) Notice: Subject to any disclaimer, the term of this patent is extended or adjusted under 35 U.S.C. 154(b) by 56 days.

This patent is subject to a terminal disclaimer.

(21) Appl. No.: 13/735,100

(22) Filed: Jan. 7, 2013

(65) Prior Publication Data
US 2013/0170958 A1 Jul. 4, 2013

Related U.S. Application Data

(63) Continuation of application No. 13/407,916, filed on Feb. 29, 2012, now Pat. No. 8,360,714, which is a continuation-in-part of application No. 13/282,919, filed on Oct. 27, 2011, now Pat. No. 8,366,385, which is a continuation-in-part of application No. 13/087,579, filed on Apr. 15, 2011, and a continuation-in-part of application No. 13/275,286, filed on Oct. 17, 2011, now abandoned.

(51) Int. Cl.
| | | |
|---|---|---|
| F01D 25/28 | (2006.01) | |
| F02C 3/107 | (2006.01) | |
| F01D 25/16 | (2006.01) | |

(52) U.S. Cl.
CPC ............ *F01D 25/28* (2013.01); *F05D 2230/70* (2013.01); *Y02T 50/671* (2013.01); *F05D 2230/72* (2013.01); *F05D 2230/80* (2013.01); *F02C 3/107* (2013.01); *F01D 25/285* (2013.01); *F01D 25/16* (2013.01)

USPC .................................. 415/122.1; 415/124.2

(58) Field of Classification Search
USPC ........ 29/889.1, 402.03, 426.1; 60/226.1, 268, 60/39.163; 415/124.2, 122.1, 189, 190, 415/209.3, 214.1
See application file for complete search history.

(56) References Cited

U.S. PATENT DOCUMENTS

| | | |
|---|---|---|
| 3,922,852 A | 12/1975 | Drabek |
| 4,132,069 A | 1/1979 | Adamson et al. |

(Continued)

FOREIGN PATENT DOCUMENTS

| | | |
|---|---|---|
| EP | 1114949 | 7/2011 |
| WO | 9527860 A1 | 10/1995 |
| WO | 2011082240 | 7/2011 |

OTHER PUBLICATIONS

International Search Report for PCT Application No. PCT/US13/27557, Apr. 8, 2013.

(Continued)

*Primary Examiner* — Ned Landrum
*Assistant Examiner* — Liam McDowell
(74) *Attorney, Agent, or Firm* — Carlson, Gaskey & Olds, P.C.

(57) ABSTRACT

A gas turbine engine includes a central body support that provides an inner annular wall for a core flow path. The central body support includes a first mount feature. A geared architecture interconnects a spool and a fan rotatable about an axis. A flex support interconnects the geared architecture to the central body support. The flex support includes a second mount feature that cooperates with the first mount feature for transferring torque there between. A method of disassembling a front architecture of a gas turbine engine includes the steps of accessing forward-facing fasteners that secure a central body support to a flex support, wherein the flex support includes a geared architecture supported thereon, removing the fasteners, and decoupling first and second mount features respectively provided on the central body support and the flex support.

26 Claims, 9 Drawing Sheets

(56) References Cited

U.S. PATENT DOCUMENTS

| | | | |
|---|---|---|---|
| 4,500,143 | A | 2/1985 | Kervistin et al. |
| 5,433,584 | A | 7/1995 | Amin et al. |
| 7,493,753 | B2 | 2/2009 | Moniz et al. |
| 7,493,754 | B2 | 2/2009 | Moniz et al. |
| 7,591,754 | B2 | 9/2009 | Duong et al. |
| 7,736,083 | B2 | 6/2010 | Lescure et al. |
| 7,765,787 | B2 | 8/2010 | Eleftheriou et al. |
| 7,797,922 | B2 | 9/2010 | Eleftheriou et al. |
| 7,926,260 | B2 | 4/2011 | Sheridan et al. |
| 8,360,714 | B2 * | 1/2013 | Otto et al. .................. 415/124.2 |
| 2008/0006018 | A1 | 1/2008 | Sheridan et al. |
| 2008/0075590 | A1 * | 3/2008 | Moniz et al. .................. 415/229 |
| 2010/0105516 | A1 | 4/2010 | Sheridan et al. |
| 2010/0132369 | A1 | 6/2010 | Durocher et al. |
| 2011/0105270 | A1 | 5/2011 | Matsuoka et al. |
| 2012/0257960 | A1 | 10/2012 | Reinhardt et al. |

OTHER PUBLICATIONS

Chinese Office Action for Application No. 201210416081.4 issued Jun. 27, 2014.

JP Office Action for Application No. 2012-237381 mailed on Jul. 1, 2014.

* cited by examiner

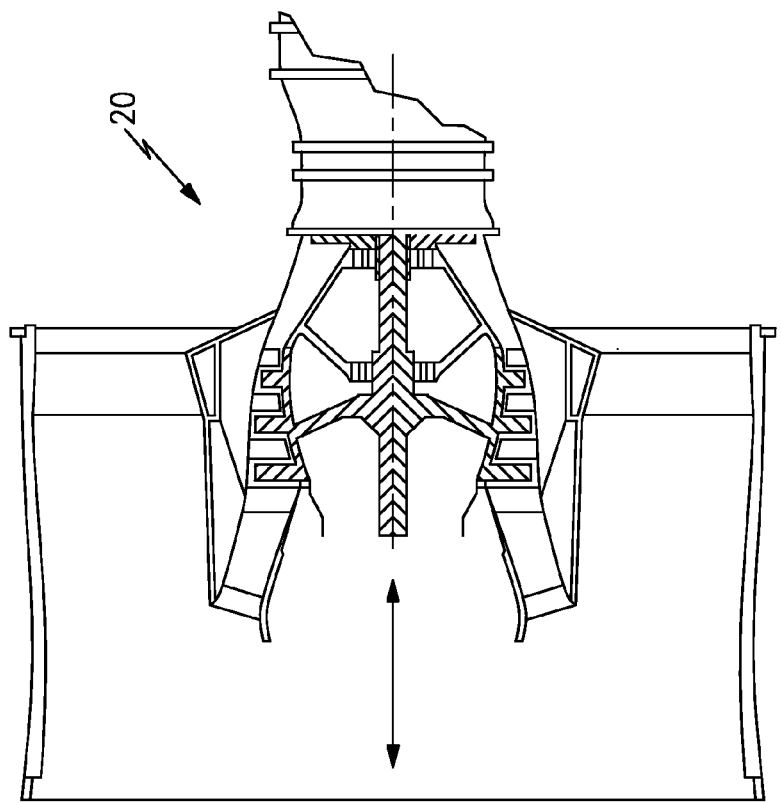
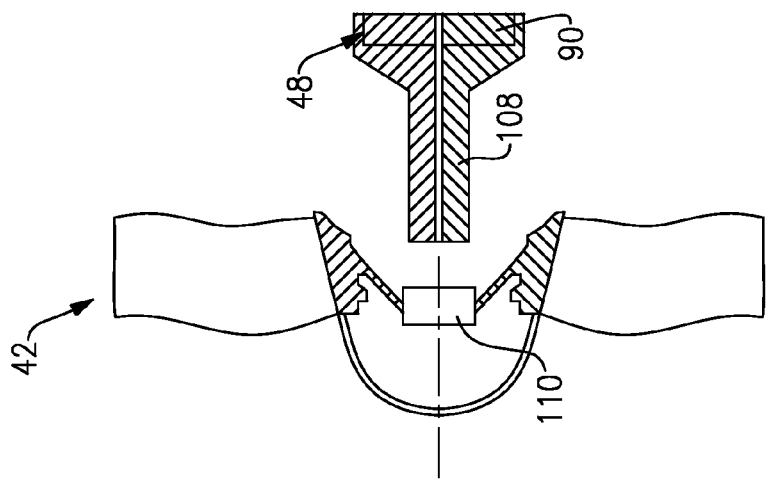
FIG.8

GAS TURBINE ENGINE FRONT CENTER BODY ARCHITECTURE

CROSS REFERENCE TO RELATED APPLICATIONS

The present disclosure is a continuation of U.S. patent application Ser. No. 13/407,916, filed on Feb. 29, 2012, which is a continuation-in-part application of U.S. patent application Ser. No. 13/282,919, filed 27 Oct. 2011, which is a continuation-in-part application of U.S. patent application Ser. No. 13/087,579, filed 15 Apr. 2011, and U.S. patent application Ser. No. 13/275,286, filed 17 Oct. 2011, now abandoned.

BACKGROUND

The present disclosure relates to a gas turbine engine, and in particular, to a case structure therefor.

Gas turbine engines typically include one or more rotor shafts that transfer power and rotary motion from a turbine section to a compressor section and fan section. The rotor shafts are supported within an engine static structure, which is typically constructed of modules with individual case sections which are joined together at bolted flanges. The flanges form a joint capable of withstanding the variety of loads transmitted through the engine static structure. An ongoing issue for gas turbine engines is the ease and speed at which certain components in such engines can be serviced.

SUMMARY

In one exemplary embodiment, a gas turbine engine includes a central body support that provides an inner annular wall for a core flow path. The central body support includes a first mount feature. A geared architecture interconnects a spool and a fan rotatable about an axis. A flex support interconnects the geared architecture to the central body support. The flex support includes a second mount feature that cooperates with the first mount feature for transferring torque there between.

In a further embodiment of the above, the central body support includes circumferentially spaced apart vanes that radially extend between and interconnect the inner annular wall and an outer annular wall.

In a further embodiment of the above, the first mount feature includes tooth groups including multiple teeth. The tooth groups are circumferentially spaced apart from one another with untoothed regions arranged between the tooth groups.

In a further embodiment of the above, the vanes are circumferentially aligned with the untoothed regions.

In a further embodiment of the above, the second mount feature includes corresponding tooth groups configured to circumferentially align and mate with the tooth groups of the first splines, and corresponding untoothed regions arranged between the tooth groups of the corresponding tooth groups.

In a further embodiment of the above, the central body support includes multiple fastener bosses circumferentially spaced from one another. The fastener bosses are aligned with the tooth groups.

In a further embodiment of the above, the untoothed region is provided by a stiffening rail protruding radially inward from a central body section providing the inner annular wall.

In a further embodiment of the above, the central body support includes an annular recess and an annular pocket axially spaced apart from one another to provide first and second lateral sides on the stiffening rail.

In a further embodiment of the above, the tooth groups include internal teeth having roots provided at a first tooth radius and extending radially inward to crests provided at a second tooth radius. The stiffening rail extends radially inward to a rail radius that is less than the first tooth radius.

In a further embodiment of the above, the geared architecture includes an epicyclic gear train having a sun gear, a ring gear, and intermediate gears arranged circumferentially about the sun gear and intermeshing with the sun gear and the ring gear.

In a further embodiment of the above, the intermediate gears are star gears grounded to the flex support against rotation about the axis. The sun gear is supported by the spool and the ring gear is interconnected to the fan.

In a further embodiment of the above, the central body support includes a first inner face arranged near the first spline and the flex support includes a first outer face arranged in an interference fit relationship with the first inner face to radially locate the flex support relative to the central body support.

In a further embodiment of the above, the central body support includes a second inner face and the flex support includes a second outer face arranged in an interference fit relationship with the second inner face. The first inner and outer faces are arranged forward of the first mount feature and the second inner and outer faces are arranged aft of the first mount feature. The second outer face is positioned radially inward relative to the first outer face.

In a further embodiment of the above, the gas turbine engine includes fasteners securing the flex support to the central body support. The fasteners include heads facing forward.

In a further embodiment of the above, the central body support includes circumferentially spaced fastener bosses and the flex support includes a radially outward extending fastener flange abutting the fastener bosses to axially locate the flex support relative to the central body support.

In a further embodiment of the above, the fastener flange includes apertures arranged circumferentially spaced from one another and receiving the fasteners.

In a further embodiment of the above, the first and second mount features are axially aligned with one another.

In a further embodiment of the above, the first and second mount features are circumferentially adjacent to one another.

In a further embodiment of the above, the first mount feature is arranged radially outward of the second mount feature.

In another exemplary embodiment, a method of disassembling a front architecture of a gas turbine engine includes the steps of accessing forward-facing fasteners that secure a central body support to a flex support, wherein the flex support includes a geared architecture supported thereon, removing the fasteners, and decoupling first and second mount features respectively provided on the central body support and the flex support.

In a further embodiment of the above, the accessing step includes the step of detaching a fan module from a fan shaft bearing support, with the fan shaft bearing support remaining secured to the central body support.

In a further embodiment of the above, the accessing step includes the step of detaching the fan shaft bearing support from the central support body without removing the geared architecture.

In a further embodiment of the above, the decoupling step includes removing a geared architecture module that includes the geared architecture and the flex support. The decoupling step leaves undisturbed a bearing that supports a front of a spool operatively connectable with the geared architecture.

In a further embodiment of the above, the first and second mount features are axially aligned with one another during the accessing step.

In a further embodiment of the above, the first and second mount features are circumferentially adjacent to one another during the accessing step.

In a further embodiment of the above, the first mount feature is arranged radially outward of the second mount feature during the accessing step.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 8 is a schematic view of an embodiment of a forward gearbox removal from a gas turbine engine.

DETAILED DESCRIPTION

Figure 1:
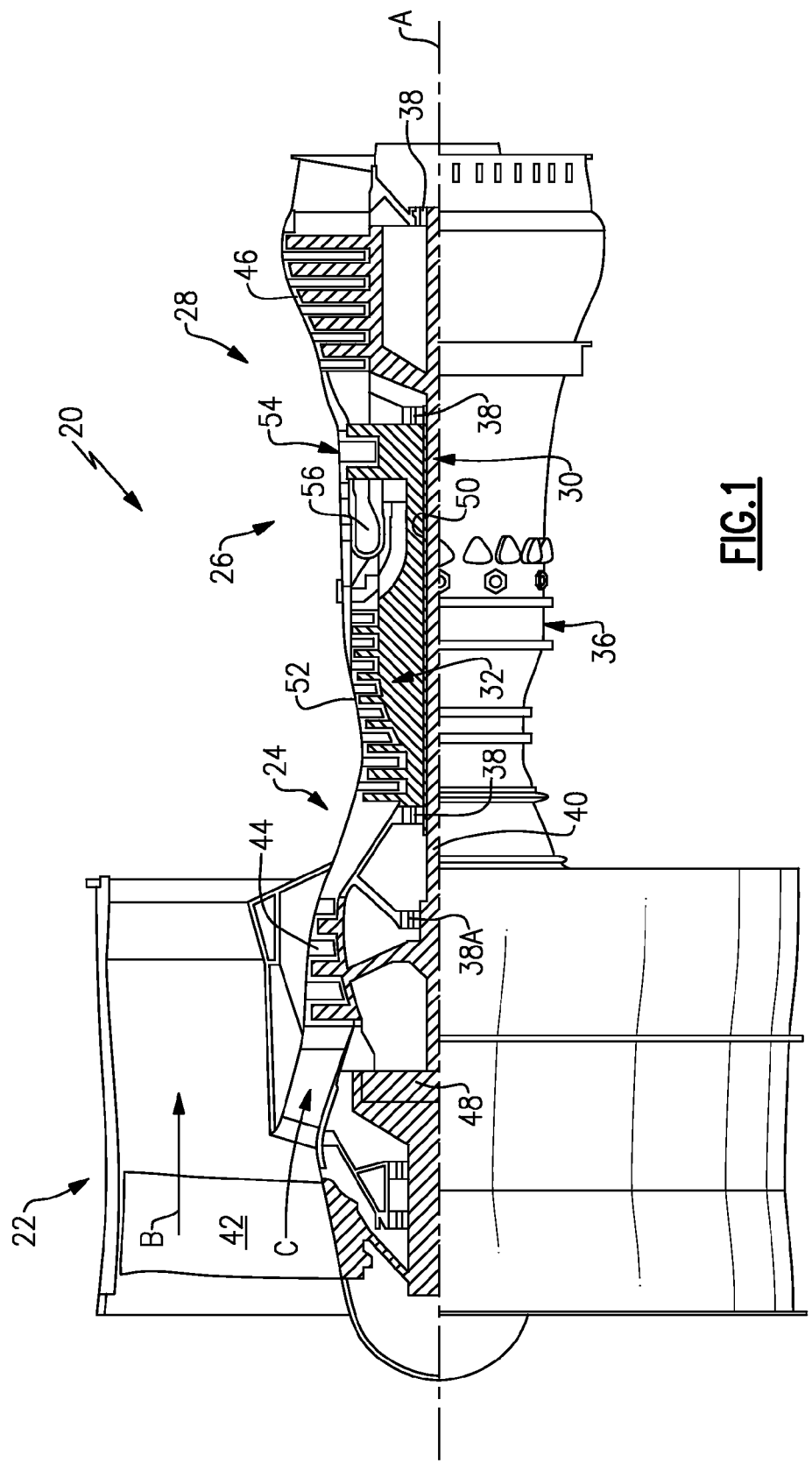
FIG. 1 is a schematic cross-section of an embodiment of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. The low speed spool 30 generally includes an inner shaft 40 that interconnects a fan 42, a low pressure (or first) compressor section 44 and a low pressure (or first) turbine section 46. The inner shaft 40 is connected to the fan 42 through a geared architecture 48 to drive the fan 42 at a lower speed than the low speed spool 30. A #2 bearing support 38A located within the compressor section 24 supports a forward end of the inner shaft 40. It should be understood that various bearing systems 38 at various locations may alternatively or additionally be provided.

The high speed spool 32 includes an outer shaft 50 that interconnects a high pressure (or first) compressor section 52 and high pressure (or first) turbine section 54. A combustor 56 is arranged between the high pressure compressor 52 and the high pressure turbine 54. As used herein, a "high pressure" compressor or turbine experiences a higher pressure than a corresponding "low pressure" compressor or turbine.

The core airflow C is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a planetary gear system or other gear system, with a gear reduction ratio of greater than about 2.3 and the low pressure turbine 46 has a pressure ratio that is greater than about 5. In one example, the geared architecture 48 includes a sun gear, a ring gear, and intermediate gears arranged circumferentially about the sun gear and intermeshing with the sun gear and the ring gear. The intermediate gears are star gears grounded to a flex support 68 (shown in FIG. 6) against rotation about the axis A. The sun gear is supported by the low speed spool 30, and the ring gear is interconnected to the fan 42.

In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.5:1. It should be understood, however, that the above parameters are only exemplary of one embodiment of a geared architecture engine and that the present invention is applicable to other gas turbine engines including direct drive turbofans.

A significant amount of thrust is provided by a bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } °R)/(518.7°R)]^{0.5}$. The "Low corrected fan tip speed" as disclosed herein according to one non-limiting embodiment is less than about 1150 ft/second. The above parameters for the engine 20 are intended to be exemplary.

Figure 2:
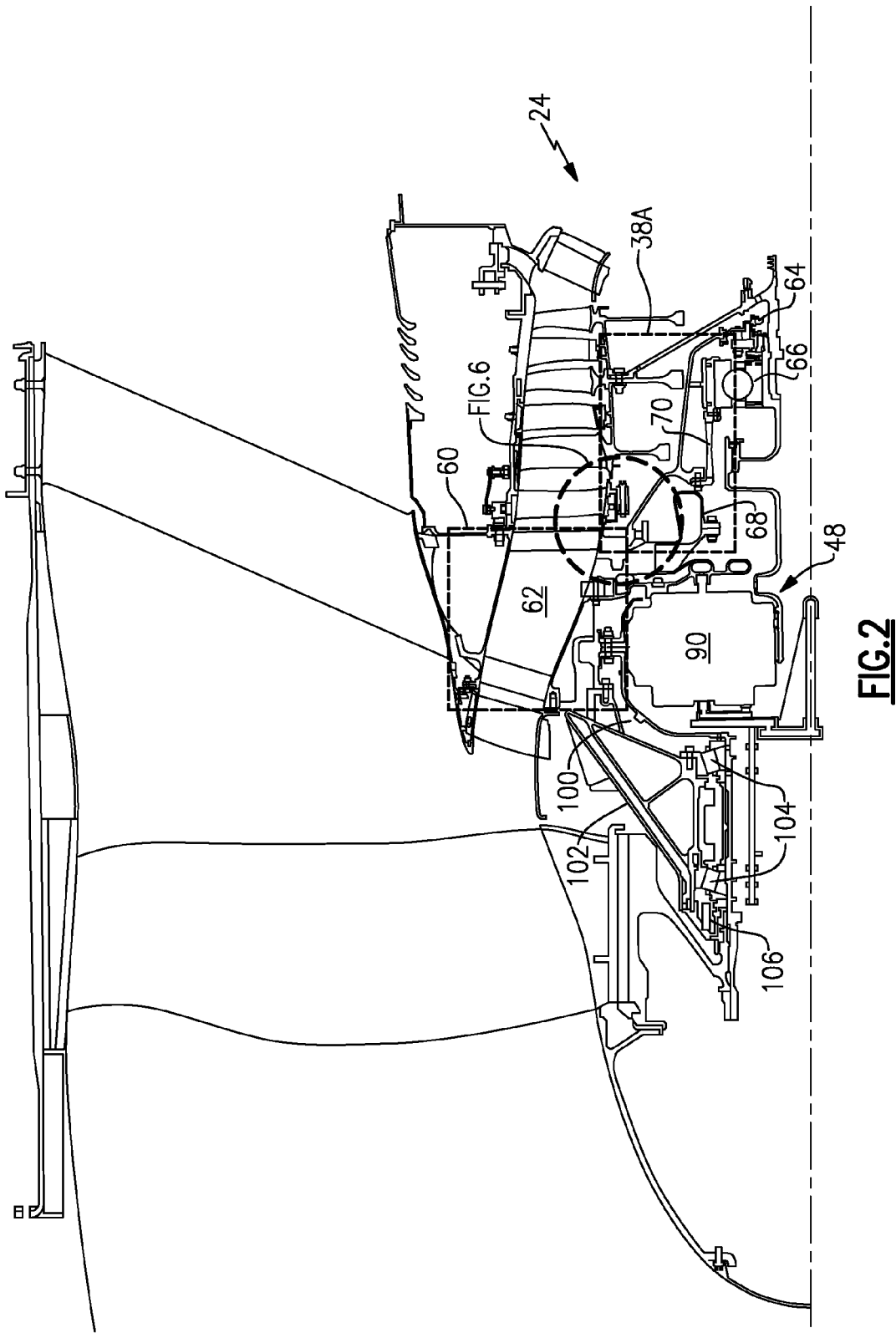
FIG. 2 is an enlarged cross-section of a front center body assembly portion of the gas turbine engine embodiment shown in FIG. 1.

With reference to FIG. 2, the engine static structure 36 proximate the compressor section 24 includes a front center body assembly 60 adjacent to the #2 bearing support 38A. The front center body assembly 60 generally includes a front center body support 62. The #2 bearing support 38A generally includes a seal package 64, a bearing package 66 and a centering spring 70.

Figure 3:
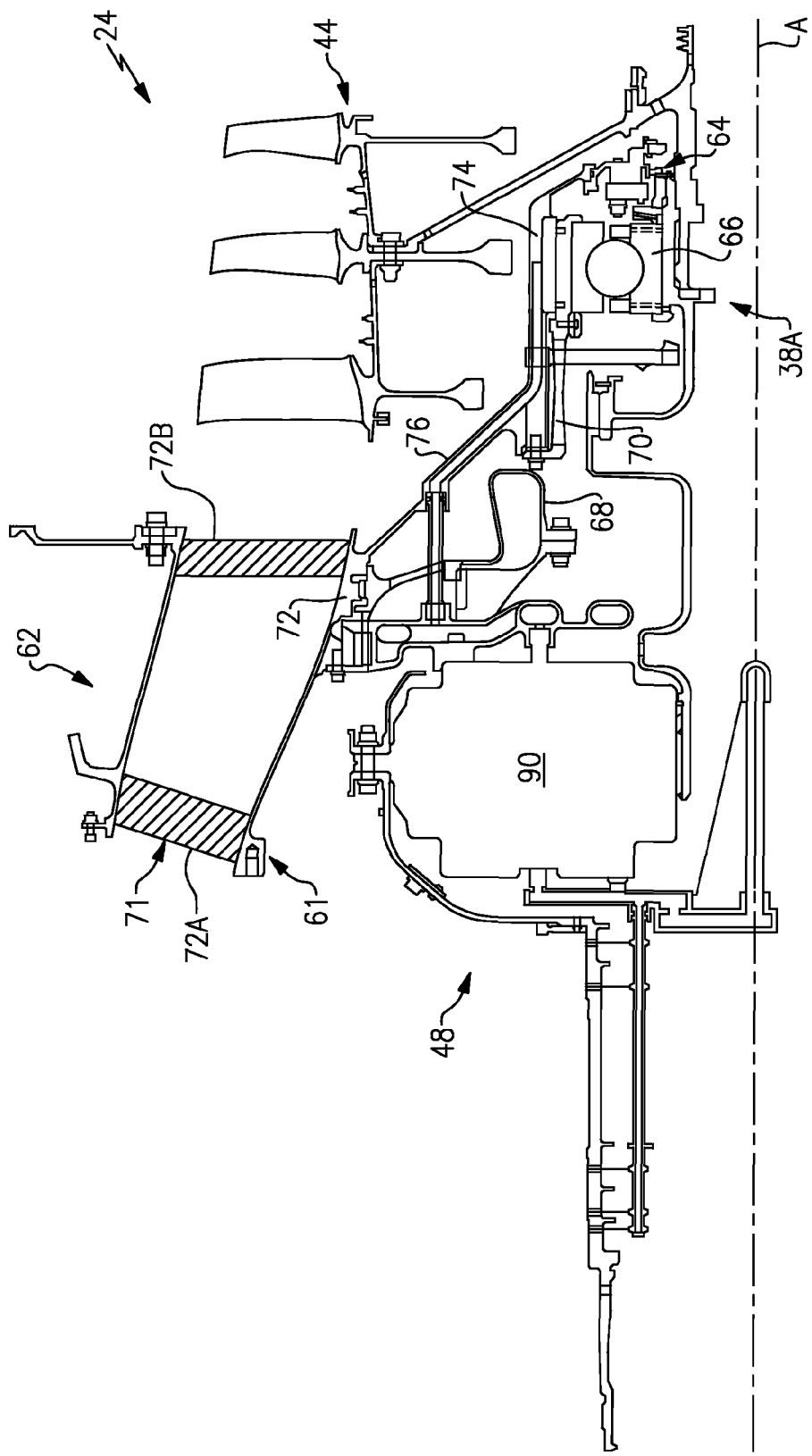
FIG. 3 is an enlarged cross-section of the geared architecture of the gas turbine engine embodiment shown in FIG. 1.
Figure 4:
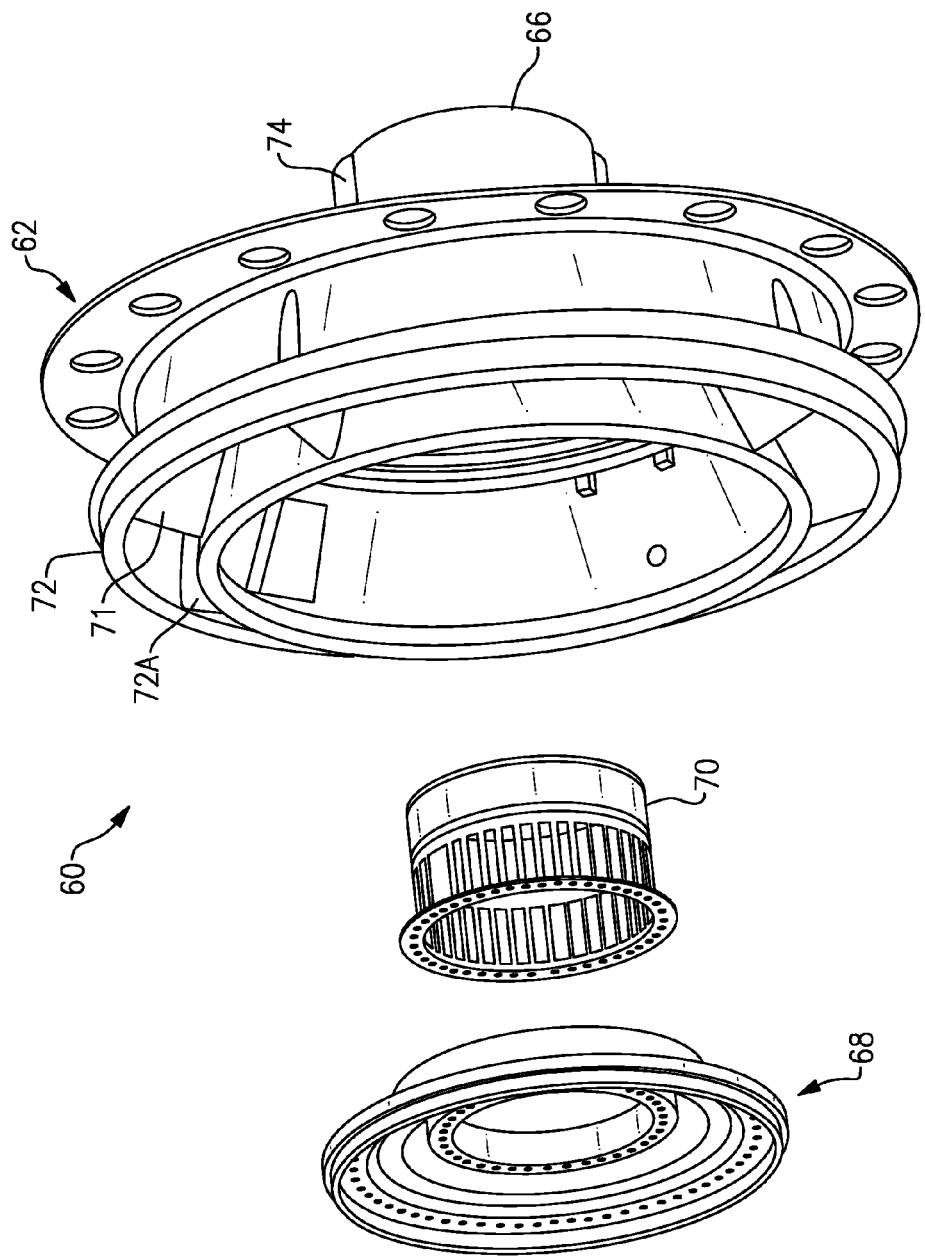
FIG. 4 is an exploded perspective view of the front center body assembly of the turbine engine embodiment shown in FIG. 1.

With reference to FIGS. 2 and 3, a flex support 68 provides a flexible attachment of the geared architecture 48 within the front center body support 62 (also illustrated in FIG. 4). The flex support 68 reacts the torsional loads from the geared architecture 48 and facilitates vibration absorption as well as other support functions. The centering spring 70 is a generally cylindrical cage-like structural component with a multiple of beams that extend between flange end structures (also illustrated in FIG. 4). The centering spring 70 resiliently positions the bearing package 66 with respect to the low speed spool 30. In one embodiment, the beams are double-tapered beams arrayed circumferentially to control a radial spring rate that may be selected based on a plurality of considerations including, but not limited to, bearing loading, bearing life, rotor dynamics, and rotor deflection considerations.

Figure 5:
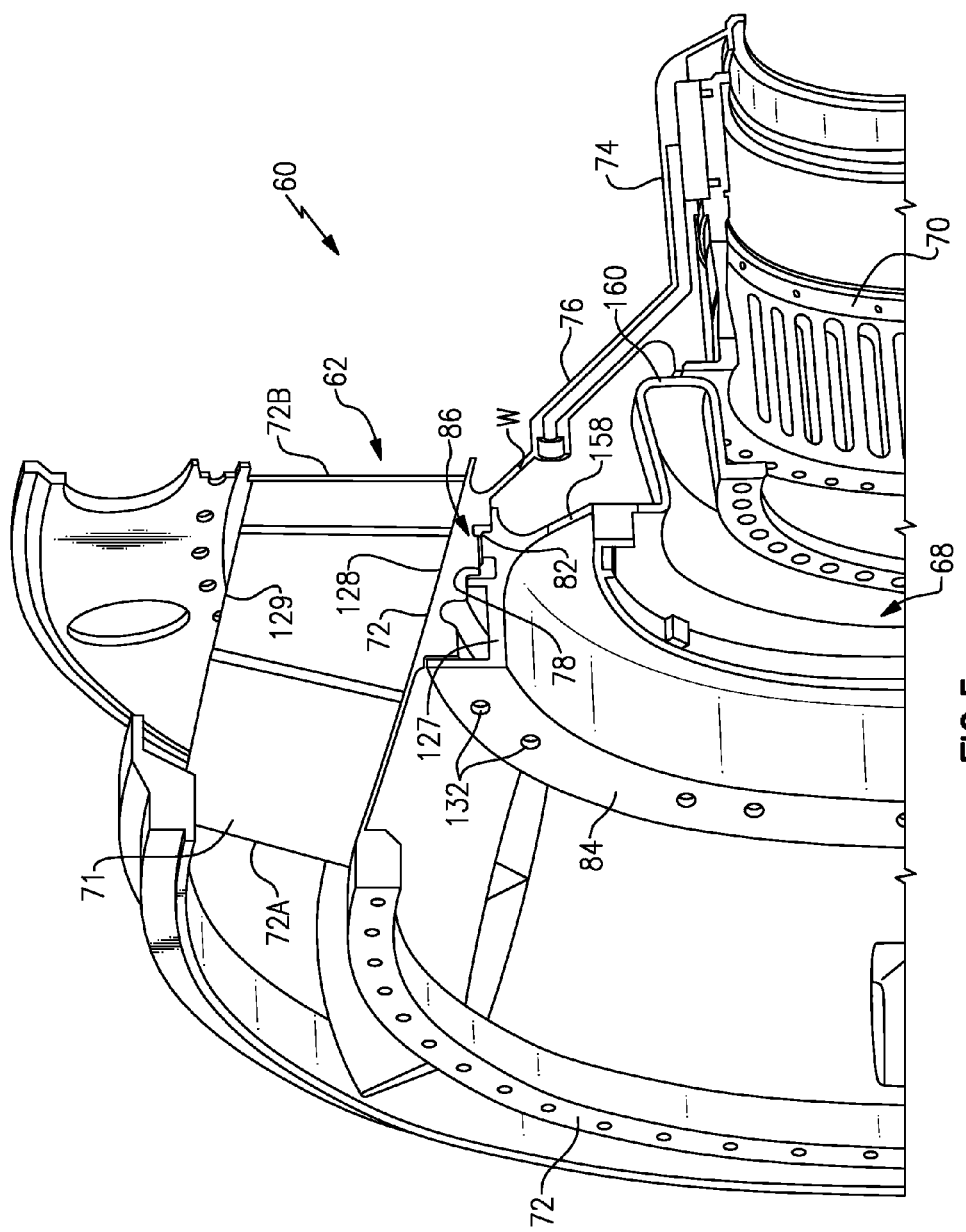
FIG. 5 is an enlarged perspective partial cross-section of a front center body support of the front center body assembly of the turbine engine embodiment shown in FIG. 1.

The front center body support 62 includes a front center body section 72 and a bearing section 74 defined about axis A with a frustro-conical interface section 76 therebetween (FIG. 5). The front center body section 72 at least partially defines the core flowpath into the low pressure compressor 44. The front center body section 72 includes an annular core passage with circumferentially arranged front center body vanes 71 having leading and trailing edges 72A, 72B shown in section in FIG. 3. The bearing section 74 is defined radially inward of the front center body section 72. The bearing section 74 locates the bearing package 66 and the seal package 64 with respect to the low speed spool 30. The frustro-conical interface section 76 combines the front center body section 72 and the bearing section 74 to form a unified load path, substantially free of kinks typical of a conventional flange joint, from the bearing package 66 to the outer periphery of the engine static structure 36. The frustro-conical interface section 76 may include a weld W (FIG. 5) or, alternatively, be an integral section such that the front center body support 62 is a unitary component.

The integral, flange-less arrangement of the frustro-conical interface section 76 facilitates a light weight, reduced part count architecture with an increased ability to tune the overall stiffness and achieve rotor dynamic requirements. Such an architecture also further integrates functions such as oil and air delivery within the bearing compartment which surrounds bearing package 66.

Figure 6:
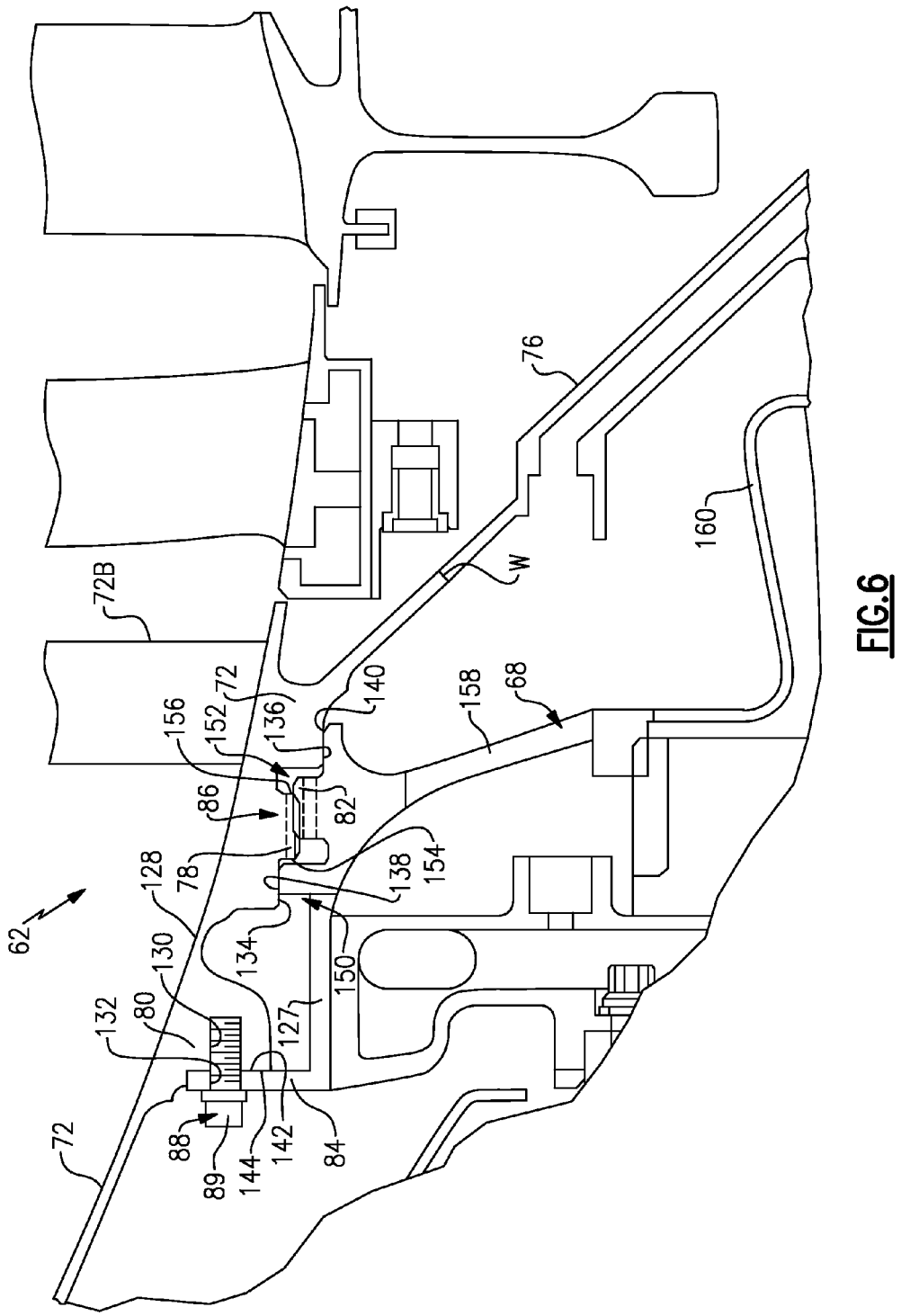
FIG. 6 is an enlarged sectional view of the front center body support of the turbine engine embodiment shown in FIG. 1.

With reference to FIG. 6, the front center body support 62 includes mount features to receive the flex support 68. The flex support 68 includes a conical support 158 that supports an integral flex member 160, which provides a fold for absorbing vibrations. In one disclosed non-limiting embodiment, the mount features of the front center body support 62 includes first splines 78, which are internal in the example, and radially inward directed fastener bosses 80 on the front center body section 72. The flex support 68 includes corresponding second splines 82, which are external in the example, and radially outwardly directed fastener flange 84. The flex support 68 is received into the front center body support 62 at a splined interface 86 formed by first and second splines 78, 82 and retained therein such that fastener flange 84 abuts fastener bosses 80. The splined interface 86 transfers torque between the first and second splines 78, 82. A set of fasteners 88, such as bolts, are threaded into the fastener bosses 80 and the fastener flange 84 to mount the flex support 68 within the front center body support 62. The fasteners 88 include heads 89 facing forward for access from the front of the engine 20.

Figure 6B:
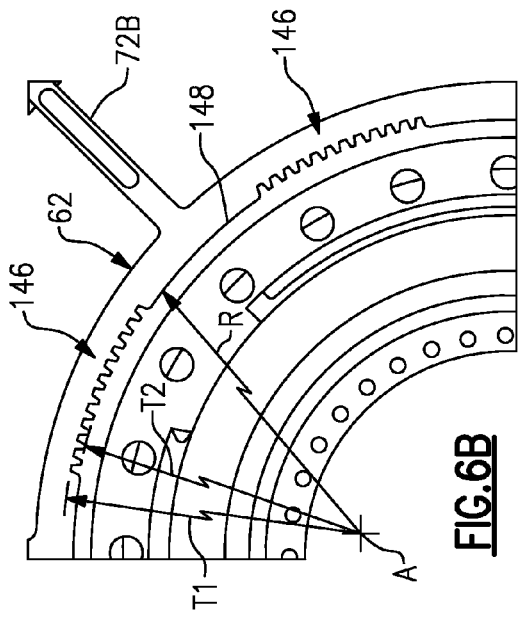
FIG. 6B is an end view of the center body support of the turbine engine embodiment shown in FIG. 1.
Figure 6A:
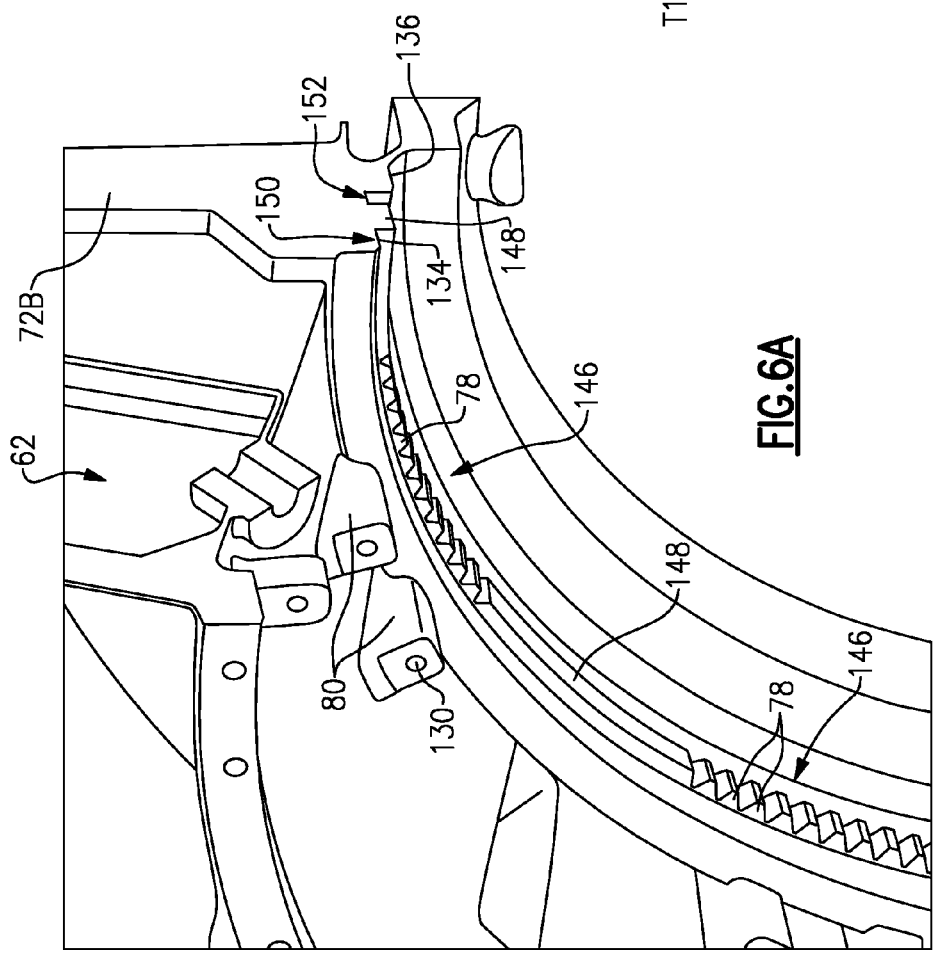
FIG. 6A is a perspective view of the center body support of the turbine engine embodiment shown in FIG. 1.

Referring to FIGS. 5-6A, the central body support 62 provides an inner annular wall 128 for the core airflow C. The vanes 71 interconnect the inner annular wall 128 to an outer annular wall 129 to provide a unitary structure. The first splines 78 include tooth groups 146 including multiple teeth. The tooth groups 146 are circumferentially spaced apart from one another with untoothed regions arranged between the tooth groups 146. The vanes 71 are circumferentially aligned with an untoothed region to structurally reinforce the interface between the first and second splines 78, 82. The second splines 82 include corresponding tooth groups that are configured to circumferentially align and mate with the tooth groups 146 of the first splines 78. Corresponding untoothed regions are arranged between the tooth groups of the second splines 82.

In the example, the fastener bosses 80 are arranged in clusters circumferentially spaced from one another, as shown in FIG. 6A. The fastener bosses 80 are aligned with the tooth groups 146. However, it should be understood that the fastener bosses 80 may be arranged in other configurations. The fastener flange 84 extends radially outward from an annular flange 127 that axially extends from the second splines 82. The fastener flange 84 includes an aft surface 142 that abuts a face 144 of the fastener bosses 80 to axially locate the flex support 68 relative to the central body support 62. The fastener flange 84 includes apertures 132 that are arranged in clusters circumferentially spaced from one another and receive the fasteners 88, which are secured in holes 130 of the fastener bosses 80. The fastener flange 84 may include interruptions or recesses that permit componentry to pass through the flex support 68 at the perimeter of the fasteners flange 84.

The untoothed region is provided by a stiffening rail 148 protruding radially inward from the central body section 72 that provides the inner annular wall 128. The central body support 62 includes an annular recess 150 and an annular pocket 152 that are axially spaced apart from one another to provide first and second lateral sides 154, 156 on the stiffening rail 148. The teeth of the tooth groups 146 include roots provided at a first tooth radius T1 and extend radially inward to crests provided at a second tooth radius T2. As shown in FIG. 6B, the stiffening rail 148 extends radially inward to a rail radius R that is less than the first tooth radius T1, and in one example, equal to the second tooth radius T2. The stiffening rail 148 and its circumferential alignment with the vanes 71 ensures improved cylindricity of the central body section 72 during engine operation.

The central body support 62 includes a first inner face 134 arranged near the first spline 78 and is provided by the annular recess 150. The flex support 68 includes a first outer face 138 arranged in an interference fit relationship at room temperature with the first inner face 134 to radially locate the flex support 68 relative to the central body support 62. A second inner face 136 is provided on the central body support 62, and the flex support 68 includes a second outer face 140 arranged in an interference fit relationship at room temperature with the second inner face 136. The first inner and outer faces 134, 138 are arranged forward of the first spline 78, and the second inner and outer faces 136, 140 are arranged aft of the first spline 78. The second outer face 140 is smaller than the first outer face 138 to facilitate assembly and disassembly of the flex support 68 from the front of the engine 20.

Figure 7:
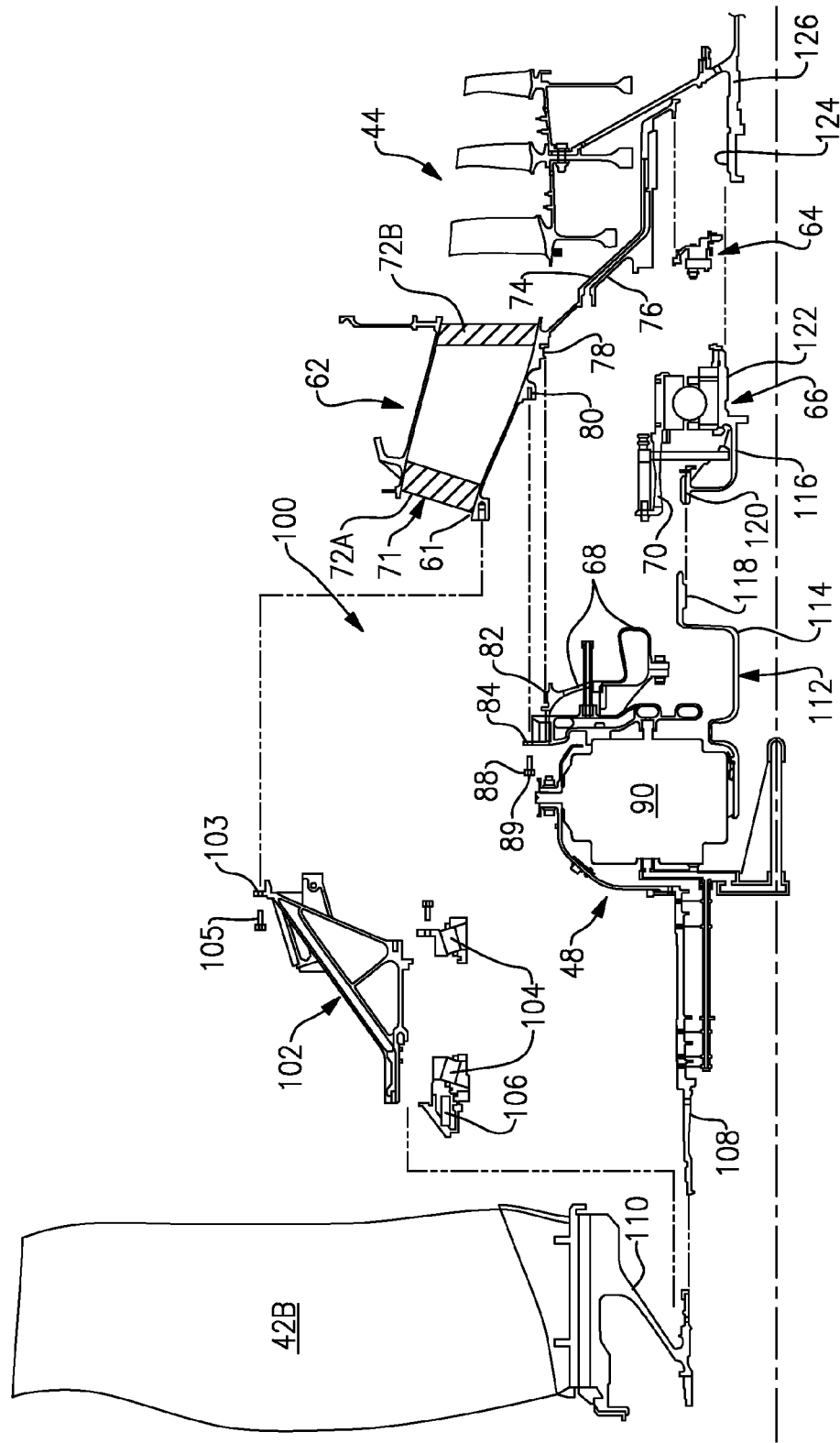
FIG. 7 is an exploded view of the front center body support of the turbine engine embodiment shown in FIG. 1.

With reference to FIG. 7, the heads 89 of the fasteners 88 are directed forward to provide access from a forward section of the front center body assembly 60 opposite the bearing package 66 of the number two bearing system 38A. The fasteners 88 are thereby readily removed to access a gearbox 90 of the geared architecture 48.

A fan shaft bearing support front wall 102 aft of the fan 42 is mounted to a forward section of the front center body support 62 to provide access to the geared architecture 48 from the front of the engine 20. The front wall 102 includes a flange 103 mountable to the front center body support 62 at the flange 61 by a multiple of fasteners 105, which fasteners 105 may in one non-limiting embodiment be bolts. The front wall 102 and the front center body support 62 define a bearing compartment 100 (also shown in FIG. 2) which mounts to the bearing package 66. The front wall 102 is removable such that the gearbox 90 may be accessed as a module. The gearbox 90 may thereby be accessed to facilitate rapid on-wing service.

It should be appreciated that various bearing structures 104 (illustrated schematically and in FIG. 2) and seals 106 (illustrated schematically and in FIG. 2) may be supported by the front wall 102 to contain oil and support rotation of an output shaft 108. The output shaft 108 connects with the geared architecture 48 to drive the fan 42. Fan blades 42B extend from a fan hub 110 which are mounted to the output shaft 108 for rotation therewith. It should be appreciated that the bearing structures 104 and seals 106 may, in the disclosed non-limiting embodiment may be disassembled with the front wall 102 as a unit after removal of the fan hub 110.

The gearbox 90 is driven by the low speed spool 30 (FIG. 1) through a coupling shaft 112. The coupling shaft 112 transfers torque through the bearing package 66 to the gearbox 90 as well as facilitates the segregation of vibrations and other transients. The coupling shaft 112 generally includes a forward coupling shaft section 114 and an aft coupling shaft section 116 which extends from the bearing package 66, however, more or fewer pieces may be used to provide the coupling shaft 112. The forward coupling shaft section 114 includes an interface spline 118 which mates with an aft spline 120 of the aft coupling shaft section 116. An interface spline 122 of the aft coupling shaft section 116 connects the coupling shaft 112 to the low speed spool 30 through, in this non limiting embodiment, splined engagement with a spline 124 on a low pressure compressor hub 126 of the low pressure compressor 44.

As a high level summary, the front architecture of the engine 20 is disassembled by detaching the fan module from a fan shaft bearing support. The fan shaft bearing support (front wall 102) remains secured to the central body support 62 over the gear box 90. The fan shaft bearing support (front wall 102) is detached from the central support body 62 without removing the gear box 90. The forward-facing fasteners 88 are accessed and removed. The first and second splines 78, 82 are decoupled, and the gear box 90 is removed with the fan shaft bearing support (front wall 102) and the flex support 68. The bearing 38A is left undisturbed.

To remove and isolate the gearbox 90, the fan hub 110 is disassembled from the output shaft 108. The multiple of fasteners 105 are then removed such that the front wall 102 is disconnected from the front center body support 62; the front wall 102 is thereafter removed from the engine. The multiple of fasteners 88 are then removed from the front of the engine 20. The geared architecture 48 is then slid forward out of the front center body support 62 such that the interface spline 118 is slid off the aft spline 120 and the outer spline 82 is slid off the internal spline 78. The geared architecture 48 is thereby removable from the engine 20 as a module (FIG. 8; illustrated schematically). It should be appreciated that other componentry may need to be disassembled to remove the geared architecture 48 from the engine 20, however, such disassembly is relatively minor and need not be discussed in detail. It should be further appreciated that other components such as the bearing package 66 and seal 64 are also now readily accessible from the front of the engine 20.

Removal of the gearbox 90 from the front of the engine 20 as disclosed saves significant time and expense. The geared architecture 48, is removable from the engine 20 as a module and does not need to be further disassembled. Moreover, although the geared architecture 48 must be removed from the engine to gain access to the bearing package 66 and the seal 64, the geared architecture 48 does not need to be removed from the engine 20 to gain access to the engine core itself.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present invention.

Although the different examples have specific components shown in the illustrations, embodiments of this invention are not limited to those particular combinations. It is possible to use some of the components or features from one of the examples in combination with features or components from another one of the examples.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

What is claimed:

1. A gas turbine engine comprising:
    a central body support providing an inner annular wall for a core flow path, the central body support including a first mount feature;
    a geared architecture interconnecting a spool and a fan rotatable about an axis; and
    a flex support interconnecting the geared architecture to the central body support, the flex support including a second mount feature operatively coupled to the first mount feature and configured to transfer torque there between.

2. The gas turbine engine according to claim 1, wherein the central body support includes circumferentially spaced apart vanes radially extending between and interconnecting the inner annular wall and an outer annular wall.

3. The gas turbine engine according to claim 2, wherein the first mount feature includes tooth groups including multiple teeth, the tooth groups circumferentially spaced apart from one another with untoothed regions arranged between the tooth groups.

4. The gas turbine engine according to claim 3, wherein the vanes are circumferentially aligned with the untoothed regions.

5. The gas turbine engine according to claim 3, wherein the second mount feature includes corresponding tooth groups configured to circumferentially align and mate with the tooth groups of the first mount feature, and corresponding untoothed regions arranged between the tooth groups of the corresponding tooth groups, wherein the untoothed region is provided by a stiffening rail protruding axially inward from a central body section providing the inner annular wall.

6. The gas turbine engine according to claim 3, wherein the central body support includes multiple fastener bosses circumferentially spaced from one another, the fastener bosses aligned with the tooth groups.

7. The gas turbine engine according to claim 3, wherein the untoothed region is provided by a stiffening rail protruding radially inward from a central body section providing the inner annular wall.

8. The gas turbine engine according to claim 7, wherein the central body support includes an annular recess and an annular pocket axially spaced apart from one another to provide first and second lateral sides on the stiffening rail.

9. The gas turbine engine according to claim 7, wherein the tooth groups include internal teeth having roots provided at a first tooth radius and extending radially inward to crests provided at a second tooth radius, the stiffening rail extending radially inward to a rail radius that is less than the first tooth radius.

10. The gas turbine engine according to claim 1, wherein the geared architecture includes an epicyclic gear train having a sun gear, a ring gear, and intermediate gears arranged circumferentially about the sun gear and intermeshing with the sun gear and the ring gear.

11. The gas turbine engine according to claim 10, wherein the intermediate gears are star gears grounded to the flex support against rotation about the axis, the sun gear is supported by the spool, and the ring gear is interconnected to the fan.

12. The gas turbine engine according to claim 1, wherein the central body support includes a first inner face arranged near the first spline, and the flex support includes a first outer face arranged in an interference fit relationship with the first inner face to radially locate the flex support relative to the central body support.

13. The gas turbine engine according to claim 12, wherein the central body support includes a second inner face, and the flex support includes a second outer face arranged in an interference fit relationship with the second inner face, the first inner and outer faces arranged forward of the first mount feature and the second inner and outer faces arranged aft of the first mount feature, the second outer face being positioned radially inward relative to the first outer face.

14. The gas turbine engine according to claim 1, comprising fasteners securing the flex support to the central body support, the fasteners including heads facing forward.

15. The gas turbine engine according to claim 14, wherein the central body support includes circumferentially spaced fastener bosses, and the flex support includes a radially outward extending fastener flange abutting the fastener bosses to axially locate the flex support relative to the central body support.

16. The gas turbine engine according to claim 15, wherein the fastener flange includes apertures arranged circumferentially spaced from one another and receiving the fasteners.

17. The gas turbine engine according to claim 1, wherein the first and second mount features are axially aligned with one another.

18. The gas turbine engine according to claim 17, wherein the first and second mount features are circumferentially adjacent to one another.

19. The gas turbine engine according to claim 17, wherein the first mount feature is arranged radially outward of the second mount feature.

20. A method of disassembling a front architecture of a gas turbine engine, comprising the steps of:
    accessing forward-facing fasteners that secure a central body support to a flex support, wherein the flex support includes a geared architecture supported thereon;
    removing the fasteners; and
    decoupling first and second mount features respectively provided on the central body support and the flex support.

21. The method according to claim 20, wherein the accessing step includes the step of detaching a fan module from a fan shaft bearing support, with the fan shaft bearing support remaining secured to the central body support.

22. The method according to claim 21, wherein the accessing step includes the step of detaching the fan shaft bearing support from the central support body without removing the geared architecture.

23. The method according to claim 22, wherein the decoupling step includes removing a geared architecture module that includes the geared architecture and the flex support, wherein the decoupling step leaves undisturbed a bearing supporting a front of a spool operatively connectable with the geared architecture.

24. The method according to claim 20, wherein the first and second mount features are axially aligned with one another during the accessing step.

25. The method according to claim 24, wherein the first and second mount features are circumferentially adjacent to one another during the accessing step.

26. The method according to claim 24, wherein the first mount feature is arranged radially outward of the second mount feature during the accessing step.

* * * * *